Dec. 23, 1930.  G. T. MARKEY ET AL  1,785,782
FEEDER
Filed Dec. 2, 1926
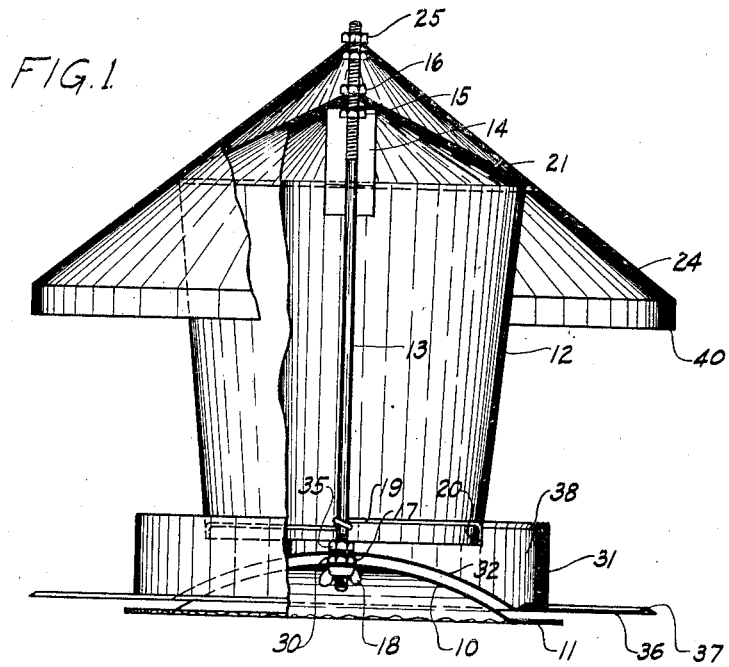
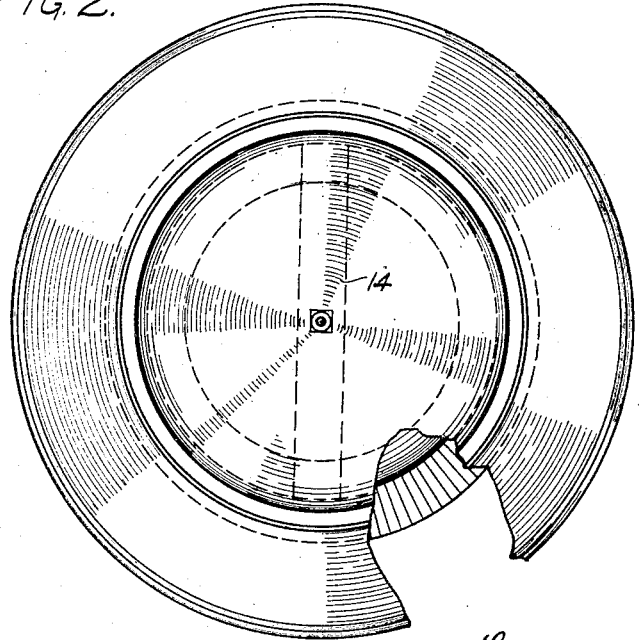
INVENTORS
George T. Markey
John B. Olson
BY
Erwin Wheeler & Morland
ATTORNEYS Patented Dec. 23, 1930

1,785,782

UNITED STATES PATENT OFFICE

GEORGE T. MARKEY AND JOHN B. OLSON, OF FORT ATKINSON, WISCONSIN, ASSIGNORS TO JAMES MANUFACTURING COMPANY, OF FORT ATKINSON, WISCONSIN

FEEDER

Application filed December 2, 1926. Serial No. 152,088.

This invention relates to improvements in feeders of that type usually classed as poultry feeders, in which the weight of the bird in feeding position on a perch or shelf is relied upon to agitate the material and cause deliveries from the storage chamber into a feeding pan or trough.

Heretofore devices of this kind have been constructed with a view to operating an agitator within the storage chamber or oscillating the storage chamber from a point of suspension or a point of support on which the storage chamber is mounted in unstable equilibrium. In the use of such structures, the power required to agitate the material varies with variations in the quantity of material contained in the storage chamber and considerable irregularity results in feeding efficiency. When the storage chamber is nearly full the weight of the bird may be insufficient to overcome its inertia, although clogging at the outlet is more likely to occur under such conditions than at any other time. On the other hand, when the storage chamber is nearly empty, the weight of the bird is likely to cause such agitation as to deliver practically all of the contents of the storage chamber into the feeding pan.

The object of this invention is to provide means for utilizing the weight of an animal or bird to cause deliveries of substantially uniform quantities of food from a storage chamber into a feeding pan regardless of the quantity of material stored in said chamber. Also to provide means whereby the weight of the animal or bird will be of substantially uniform effectiveness in producing the desired agitation or variation in the outlet of the storage chamber regardless of the quantity of material therein.

Further objects of this invention are to provide simple and inexpensive means for adapting the feeder for either indoor or outdoor use; for adjusting the feeder or varying the distance between the storage chamber and the pan in accordance with the character and condition of the material to be fed and the feeding requirements; to provide a simple, inexpensive, compact, and durable feeder; and to provide a feeder particularly adapted for the feeding of light birds by reason of sensitiveness in response to light pressures such as are exerted by very young chickens.

In the drawings:

Figure 1 is an elevation partly in vertical section of a feeder embodying our invention.

Figure 2 is a plan view of the same without the canopy, storage chamber, and feeding pan partially broken away to expose the base.

Like parts are identified by the same reference characters in both views.

The base preferably comprises a circular piece of sheet metal having a centrally dished or upwardly offset portion 10 and an annular supporting portion 11, the latter being preferably corrugated to eliminate internal strains caused by upsetting the central portion and prevent warping, the annular portion being thereby adapted to conform to a flat surface and properly support the feeder. An open-ended storage reservoir 12 is supported above the base by a post 13 which is secured to the base with its upper end extending through a bracket 14 secured to the upper portion of the storage chamber and preferably extending upwardly therefrom. The bracket may consist of a flat bar formed of sheet metal having elbowed end portions secured to the walls of the storage chamber at opposite sides and centrally apertured to receive the post 13. As shown, the upper end post is screw-threaded and provided with a pair of nuts 15 and 16, respectively engaging the top and bottom surfaces of the horizontal portion of the bracket 14, whereby the storage chamber is suspended from the post and the lower nut 15. These nuts also provide means for vertically adjusting the storage chamber along the post 13. The lower end of the post is also threaded and similarly secured to the central portion of the base, the base having an aperture through which the post extends and to which it is clamped by the nut 17 and a thumb nut 18. A wire cross brace 19 is preferably coiled about the post with its ends secured to opposite sides of the storage chamber 12, the lower margin of which is infolded as indicated at 20 to embrace the down-turned ends of the brace rod 19. The storage chamber wall preferably has the form of an inverted truncated cone, and its upper margin may be provided with a conical cap 21 suitably apertured at its apex to allow the post to pass through it and be secured by the nut 16. A canopy 24 of suitably larger diameter may be similarly supported on the post above the nut 16 and secured in position by a thumb nut 25, removal of which will permit the removal of the canopy 24 when the feeder is otherwise housed. When the feeder is exposed to the elements, the canopy 24 will protect the feeding fowls from rain, the canopy having sufficient spread to cover all portions of the feeder.

It will be observed that the nut 17 has a convexly rounded upper surface 30. A feeding pan 31 has its bottom upwardly dished in the central portion 32 and apertured to receive the post. This pan is supported upon the convexly rounded upper surface 30 of the nut 17 and is, therefore, in unstable equilibrium. If desired, a co-operating nut 35 may be threaded on the post above the bottom of the pan to protect the aperture from becoming clogged by the material under direct pressure of the mass in the storage chamber.

The pan is provided with an outwardly extending annular bottom flange 36 preferably having a bead 37 at its outer margin to maintain its shape and assist in preventing the fowls from slipping off from the platform thus formed when the platform tilts. The pan being wholly supported on the convex upper surface of the nut 30, slight weight applied to the flange 36 at any point will tilt the pan downwardly on that side, thereby varying the distance between the dished portion 32 and the lower margin of the storage chamber. This agitates the material in the storage chamber which, of course, rests upon this rounded surface 32 and causes material to feed outwardly toward the side wall of the pan, particularly on the side where the downward tilting occurs. The pan has a diameter considerably greater than that of the lower portion of the storage chamber, thereby providing a feeding space or trough 38 to which the fowls have access.

While the invention has been described with particular reference to the feeding of fowls, it will, of course, be understood that it may also be employed for feeding animals, more particularly small animals such as rabbits or young pigs.

By vertically adjusting the storage chamber along the post the distance between its lower margin and the bottom of the pan may be varied in accordance with the character and condition of the material to be fed. The cap and canopy will, of course, be correspondingly adjusted, this being conveniently accomplished by the nuts threaded to the upper end portion. It will, of course, be understood that the canopy will preferably be of sufficient diameter to not only cover the pan but to also cover the feeding space,—i. e. the space occupied by the animals or birds when feeding from the pan. The outer margins of the canopy are provided with downwardly extending portions which may, if desired, have a flexibly yielding skirting 40.

We claim:

1. The combination with a storage chamber having an opening in its bottom, a circular pan underneath said opening and having a diameter greater than the bottom portion of the storage chamber and a spherically rounded support for the central portion of the pan adapted to allow it to tilt in any direction and to hold the pan in feed regulating relation to the storage chamber.

2. The combination with a storage chamber having an opening in its bottom, a circular pan underneath said opening and having a diameter greater than the bottom portion of the storage chamber, and a spherically round support for the central portion of the pan adapted to allow it to tilt in any direction and to hold the pan in feed regulating relation to the storage chamber, said pan having the central portion of its bottom upwardly offset to receive said support on the underside and provide a deflector on the upper side adapted to direct material from the storage chamber outwardly toward the marginal portions of the pan.

3. A feeder comprising the combination of a base having an upwardly extending concavo-convex central portion, a post centrally secured to said portion, a storage chamber suspended from the upper end of said post and a feeding pan centrally supported by said post and base in unstable equilibrium underneath the storage chamber, said pan having a diameter greater than the bottom portion of the storage chamber whereby material from the storage chamber will be distributed outwardly in the pan when the latter is oscillated.

4. A feeder comprising the combination of a base having an upwardly extending concavo-convex central portion, a post centrally secured to said portion, a storage chamber suspended from the upper end of said post and a feeding pan centrally supported by said post and base in unstable equilibrium underneath the storage chamber, said pan having a diameter greater than the bottom portion of the storage chamber whereby material from the storage chamber will be distributed outwardly in the pan when the latter is oscillated, said storage chamber being vertically adjustable on the post to vary the distance between its lower margins and the bottom of the pan.

5. A feeder including the combination with a supporting post, of an open ended storage chamber surrounding the post and provided with a bracket at its upper end engageable with said post, a canopy adapted to be secured to the upper end of the post, and a feeding pan mounted on the post underneath the storage chamber with its central portion loosely connected with the post, said pan being adapted to tilt in various directions upon its post connection.

6. A feeder including the combination with a supporting post, of an open ended storage chamber surrounding the post and provided with a bracket at its upper end engageable with said post, a canopy adapted to be secured to the upper end of the post, and a feeding pan mounted on the post underneath the storage chamber with its central portion loosely connected with the post, said pan being adapted to tilt in various directions upon its post connection, and being provided with outwardly extending rests adapted to be actuated by an animal or bird when placing itself in feeding position.

7. A feeder comprising the combination with a supporting post, a pan having the central portion of its bottom upwardly rounded and centrally apertured to receive said post, the supporting member on the post adapted to hold the pan in unstable equilibrium, and a storage chamber adjustably secured to and supported by the upper end of the post and provided with an outlet in feed regulating relation to the pan, whereby, when the pan is tilted, material from the storage chamber will be allowed to pass into the pan.

8. A feeder comprising the combination with a supporting post, a pan having the central portion of its bottom upwardly rounded and centrally apertured to receive said post, the supporting member on the post adapted to hold the pan in unstable equilibrium, and a storage chamber adjustably secured to the upper end of the post and provided with an outlet in feed regulating relation to the pan, whereby, when the pan is tilted, material from the storage chamber will be allowed to pass into the pan, said storage chamber having an open top, a removable cap for the storage chamber adapted to be secured to the post and a canopy adapted to be removably secured to the post above said cap and to cover the feeding space about said pan.

9. A feeder comprising the combination of a base plate having an upwardly rounded central portion, a post extending through the base plate and provided with clamping nuts for securing the post to the raised central portion of the plate, a feeding pan having a correspondingly upwardly rounded bottom portion centrally apertured to receive the post and supported from the post in spaced relation to the base while allowing it to freely tilt in various directions, and a storage chamber supported from the post and having an open bottom in spaced relation to the upwardly rounded central portion of the pan.

10. A feeder comprising the combination of a base plate having an upwardly rounded central portion, a post extending through the base plate and provided with clamping nuts for securing the post to the raised central portion of the plate, a feeding pan having a correspondingly upwardly rounded bottom portion centrally apertured to receive the post and supported from the post in spaced relation to the base while allowing it to freely tilt in various directions, and a storage chamber supported from the post and having an open bottom in spaced relation to the upwardly rounded central portion of the pan, said storage chamber being vertically adjustable on said post to vary the rate of delivery into the pan when the latter is tilted.

11. In a feeder, the combination with a storage chamber having an outlet in its lower portion and a feeding pan positioned to receive material from said outlet, of a centrally disposed supporting post, means for relatively adjusting the storage chamber and a pan thereon to regulate deliveries through said outlet, and a canopy adjustably mounted on the post and covering the pan and the encircling feeding space.

12. In a feeder, a base having an upwardly rounded central portion, a superposed pan having a correspondingly upwardly rounded central portion and means for centrally supporting the pan substantially in unstable equilibrium and normally in spaced relation to the base.

13. In a feeder, a base having an upwardly rounded central portion, a superposed pan having a correspondingly upwardly rounded central portion and means for centrally supporting the pan substantially in unstable equilibrium and normally in spaced relation to the base, said pan being provided with an encircling outwardly projecting member adapted to support animals or birds in feeding position.

14. In a feeder, the combination with a support having a fulcrum, of a feeding pan mounted on said fulcrum for tilting movement thereon, and a storage chamber above the pan having an opening adapted to deliver material therein to the pan, said pan being positioned to limit the flow from the chamber by the proximity of its bottom to the margin of said opening, and having its fulcrum adjacent the plane in which said opening is disposed, whereby the pan with its normal content of food material may be tilted under the weight of a fowl applied to one side thereof, said fulcrum being in close proximity to the center of gravity of the pan and its contents.

15. In a feeder, the combination with a support having a fulcrum, of a feeding pan mounted on said fulcrum for tiltable relation thereto, a storage chamber above the pan having an opening adapted to deliver material therein to the pan, said pan being positioned to limit the flow from the chamber by the proximity of its bottom to the margin of said opening, and a rest for fowl extending annularly about the pan and supported thereby.

GEORGE T. MARKEY.
JOHN B. OLSON.